US009512765B2

(12) United States Patent
Horst et al.

(10) Patent No.: US 9,512,765 B2
(45) Date of Patent: Dec. 6, 2016

(54) METHOD FOR THE LOAD DEPENDENT REDUCTION OF FUEL CONSUMPTION FOLLOWING DECELERATION FUEL CUT OUT

(71) Applicant: GM GLOBAL TECHNOLOGY OPERATIONS LLC, Detroit, MI (US)

(72) Inventors: Stefan Horst, Neu-Isenburg (DE); Arnaud Schilly, Ruesselsheim (DE)

(73) Assignee: GM GLOBAL TECHNOLOGIES OPERATIONS LLC, Detroit, MI (US)

(*) Notice: Subject to any disclaimer, the term of this patent is extended or adjusted under 35 U.S.C. 154(b) by 0 days.

(21) Appl. No.: 14/299,869

(22) Filed: Jun. 9, 2014

(65) Prior Publication Data

US 2015/0013311 A1    Jan. 15, 2015

(30) Foreign Application Priority Data

Jun. 6, 2013    (DE) .................. 10 2013 009 476

(51) Int. Cl.
| | | |
|---|---|---|
| *F01N 3/00* | (2006.01) |
| *F01N 3/22* | (2006.01) |
| *F02D 41/02* | (2006.01) |
| *F02D 41/14* | (2006.01) |
| *F01N 3/10* | (2006.01) |

(52) U.S. Cl.
CPC .............. *F01N 3/22* (2013.01); *F02D 41/0295* (2013.01); *F02D 41/1441* (2013.01); *F01N 3/101* (2013.01); *Y02T 10/22* (2013.01)

(58) Field of Classification Search
CPC .......... F01N 3/22; F01N 9/00; F01N 2430/06; F01N 2560/025; F01N 2560/14; F01N 2570/16; F01N 2900/08; F01N 2900/1624; F01N 3/101; Y02T 10/47; Y02T 10/22; F02D 41/0295; F02D 41/1441
USPC ...................................... 60/272–324
See application file for complete search history.

(56) References Cited

U.S. PATENT DOCUMENTS

| | | | | |
|---|---|---|---|---|
| 2004/0040282 A1* | 3/2004 | Zhu ................................ 60/276 |
| 2004/0261402 A1* | 12/2004 | Sealy et al. .................... 60/285 |
| 2008/0245056 A1* | 10/2008 | Kawakita ............ F02D 41/0295 60/276 |
| 2010/0223909 A1* | 9/2010 | Schreurs et al. ................ 60/276 |
| 2011/0083425 A1* | 4/2011 | Sealy et al. .................... 60/277 |

FOREIGN PATENT DOCUMENTS

| | | |
|---|---|---|
| DE | 102004029899 A1 | 1/2006 |
| DE | 102006023434 A1 | 11/2006 |
| DE | 102009053091 A1 | 5/2011 |

* cited by examiner

*Primary Examiner* — Audrey K Bradley
*Assistant Examiner* — Kelsey Stanek
(74) *Attorney, Agent, or Firm* — Lorenz & Kopf LLP

(57) ABSTRACT

A method for controlling a motor vehicle with an internal combustion engine and a catalytic converter is disclosed. The method includes: determining an oxygen storage value, which is a dimension for oxygen stored in the catalytic converter, detecting an engine load, carrying out a part evacuation of the oxygen from the catalytic converter with a fuel enrichment when the oxygen storage value exceeds a trigger evacuation threshold value and when the engine load is below a low-load threshold value.

9 Claims, 4 Drawing Sheets

METHOD FOR THE LOAD DEPENDENT REDUCTION OF FUEL CONSUMPTION FOLLOWING DECELERATION FUEL CUT OUT

TECHNICAL FIELD

The technical field relates to a method for controlling a motor vehicle with an internal combustion engine and a catalytic converter.

BACKGROUND

Currently known internal combustion engines, in particular spark-ignition engines, include a catalytic converter, which based on a flow path to be covered by the exhaust gas is arranged in an exhaust tract downstream of the actual engine. In operating phases, in which a deceleration fuel cut out occurs, for example during coasting, oxygen accumulates in the catalytic converter. With known methods for controlling a motor vehicle with internal combustion engine and catalytic converter mixture enrichment is initiated for evacuating the oxygen from the catalytic converter. During the mixture enrichment, additional fuel is injected beyond a stoichiometric air/fuel ratio (lambda=1), which evacuates the oxygen in the catalytic converter.

SUMMARY

In accordance with the present disclosure a method is provided in which the pollutant emission can be improved and the fuel consumption reduced. The method for controlling a motor vehicle with an internal combustion engine and a catalytic converter, includes: (a) determining an oxygen storage value which is a dimension for oxygen stored in the catalytic converter; (b) detecting an engine load; and (c) carrying out a part evacuation of the oxygen from the catalytic converter upon fuel enrichment when the oxygen storage value exceeds a trigger evacuation threshold value and when the engine load is below a low-load threshold value. Here, the fuel enrichment, depending on the value of the low-load threshold value, can take place at a relatively low level, i.e. only a little additional fuel can be injected. Because of this, the 3-way function of the catalytic converter is substantially maintained and it is avoided that upon a further deceleration fuel cut out additional fuel is injected into the internal combustion engine. Upon additional fuel injection in operating phases with deceleration fuel cut out, this additional fuel would be excessive and therefore lead to combustion of the oxygen which was additionally introduced into the catalytic converter through the deceleration fuel cut out.

Through the fuel enrichment at a lower level, fewer carbon monoxides and hydrocarbons can be emitted and the fuel consumption additionally reduced.

In a configuration, the fuel enrichment is carried out at a lambda value from 0.8 to 0.99, in particular from 0.92 to 0.97 or from 0.94 to 0.96.

Here, the air/fuel mixture at a lambda value below 1.0 is rich, i.e. low in air and at a lambda value greater zero, lean, i.e. rich in air. With the abovementioned lambda values a slightly rich mixture is adjusted. Accordingly, the fuel enrichment is relatively low. Because of this, fuel can be saved for when upon a deceleration fuel cut out with subsequent fuel enrichment a renewed deceleration fuel cut out takes place, which frequently occurs in the MVEG-B test cycle and in city traffic, such that less additional fuel is unnecessarily injected for evacuating.

At an elevated engine load, which is present from the low-load threshold value, the catalytic converter accordingly is evacuated through a post-cat control. The post-cat probe detects oxygen present in the exhaust gas downstream of the catalytic converter. This oxygen can be oxygen which is just entering the catalytic converter and stored and liberated oxygen. In the case of detected oxygen excess, more fuel is injected through the post-cat control so that the oxygen stored in the catalytic converter is reduced.

In a configuration, the part evacuation is 0.1 to 3 seconds, in particular 0.15 to 2.5 seconds or 0.2 to 2 seconds long. Accordingly, the fuel enrichment can be configured with respect to time so that only a relatively minor component of oxygen is reduced, but the 3-way function of the catalytic converter is restored again.

According to a further configuration, by way of a post-cat probe arranged downstream of the catalytic converter a lambda value from 0.997 to 0.998 is adjusted following step c) in a step d) until the oxygen storage value drops below a lower evacuation threshold value or the engine load exceeds a high-load threshold value.

Accordingly, under these conditions, the oxygen is slowly evacuated. For as long as the engine load is below the high-load threshold value and for as long as the oxygen storage value drops to a value below the lower evacuation threshold value, the control via the post-cat probe is active.

This post-cat control intervention following a part evacuation is adjusted in its effect like a continued catalytic converter evacuation with very low enrichment, which can also take relatively long in terms of time.

In a further configuration, the oxygen storage value during this post-cat control activity is modeled with the help of lambda control and engine parameters and updated if required.

At a high engine load (greater than the high-load threshold value), the catalytic converter should be relatively quickly evacuated or freed of stored oxygen because of an elevated flow rate of exhaust gas, so that the oxygen storage value can be rapidly brought to its setpoint level.

The described method and the advantageous configurations can be provided in a motor vehicle, in particular in a control unit for controlling an internal combustion engine.

The control unit can have a digital microprocessor unit (CPU) which is data-connected to a storage system and a bus system, a working memory (RAM) and a storage means. The CPU is designed to execute commands, which are embodied as a program which is stored in a storage system, to detect input signals from the data bus and emit output signals to the data bus. The storage system can have various storage media such as optical, magnetic, solid-state and other non-volatile media, on which a corresponding computer program for carrying out the method and the advantageous configurations is stored. The program can be of such a nature that it embodies or is capable of carrying out the methods described here, so that the CPU can carry out the steps of such methods and thus control the internal combustion engine.

Suitable for carrying out a method is a computer program which includes program code means in order to carry out all steps of any one of the claims when the program is executed on a computer. The computer program can be read into already existing control units with simple means and used in order to control an internal combustion engine. Provided for this purpose is a computer program product with program code means, which are stored on a computer-readable data carrier in order to carry out the method according to any one of the claims when the program product is executed on a computer. The computer program product can also be integrated in control units as retrofit option.

In other words, the preceding aspect relates to a computer program product which can also be described as a computer or machine-readable medium, and which is to be understood as a computer program code on a carrier. Here, the carrier can be of a volatile or non-volatile nature with the consequence that the computer program product can also be described as having a volatile or non-volatile nature.

An example of a volatile computer program product is a signal, or an electromagnetic signal and an optical signal, which is a carrier for the computer program code. Carrying the computer program code can be achieved by modulating the signal with a conventional modulation process such as QPSK for digital data, so that binary data, which represents the computer program code, is impressed on the volatile electromagnetic signal. Such signals are used for example when a computer program code is transmitted to a laptop without cable via a Wi-Fi connection.

In the case of a non-volatile computer program product a computer program code is embodied in a substrate-bound storage medium. The storage medium is then the abovementioned non-volatile carrier, so that the computer program code is permanently or non-permanently stored in or on the storage medium. The storage medium can be of a conventional type such as is known for example in the field of computer technology, for example a flash memory, an ASIC, a CD and the like.

A further aspect of the present disclosure relates to an apparatus for controlling a motor vehicle with an internal combustion engine and a catalytic converter including: (a) an oxygen sensor for determining an oxygen storage value, which represents a dimension for oxygen stored in the catalytic converter, (b) a sensor for detecting an engine load, (c) an evacuator operably coupled to the catalytic convertor carrying out a part evacuation of the oxygen upon fuel enrichment when the oxygen storage value exceeds a trigger evacuation threshold value and when the engine load is below a low-load threshold value.

In a configuration of the apparatus, the means are configured in order to carry out the fuel enrichment at a lambda value from 0.8 to 0.99, in particular from 0.92 to 0.97 or from 0.94 to 0.96.

In a further configuration of the apparatus, the part evacuation is 0.1 to 3 seconds, in particular 0.15 to 2.5 seconds or 0.2 to 2 seconds long.

In a further configuration of the apparatus, a post-cat probe is provided downstream of the catalytic converter adjust a lambda value from 0.997 to 0.998 until the oxygen storage value drops to a value below the evacuation threshold value or the engine load exceeds a high-load threshold value.

In a further configuration of the apparatus, a data set is provided which models the oxygen storage value with the help of engine parameters, updating it if appropriate.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
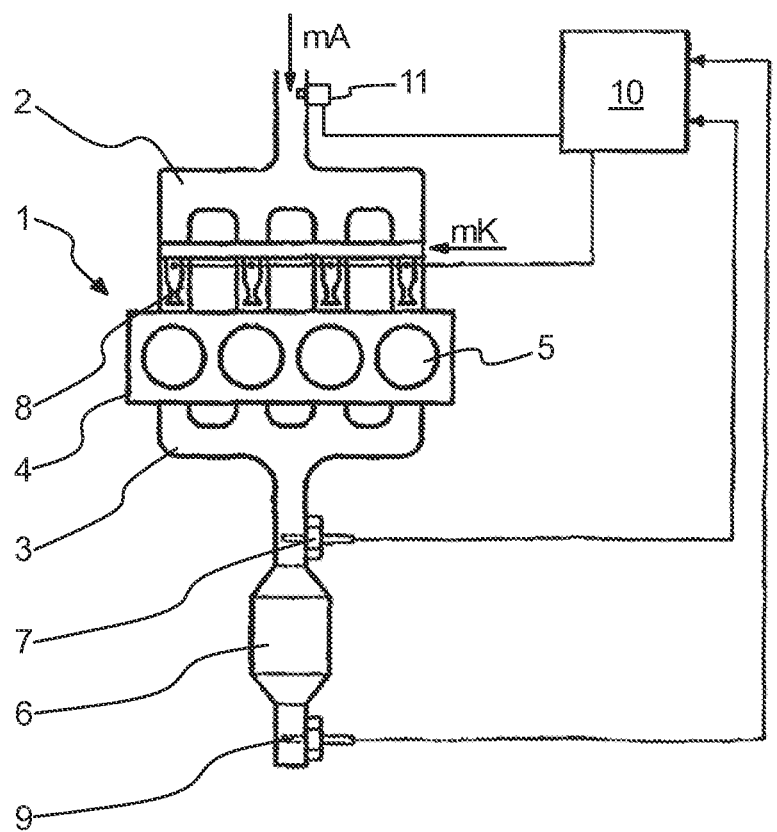
FIG. 1 schematically shows an internal combustion engine with an intake tract and an exhaust tract, in which a catalytic converter is arranged.

FIG. 1 shows an internal combustion engine 1 with an intake tract 2 and an exhaust tract 3. In an engine block 4, cylinders 5 which are not shown in detail are arranged, which during operation draw in air in the known manner, compressing it mixed with fuel, combusting and expelling it as exhaust gas through the exhaust tract 3. In the exhaust tract 3 a catalytic converter 6 is arranged, which is configured as a 3-way catalytic converter. The exhaust gas contains nitric oxides (NOx), carbon monoxide (CO) and uncombusted hydrocarbons (HC). When a stoichiometric air/fuel ration (lambda=1) is maintained, just enough oxygen in pure form and bound in nitric oxides (NOx) remains in order to oxidize the carbon monoxide and the uncombusted hydrocarbons. By way of a pre-cat probe 7, the oxygen present in the exhaust gas can be measured and the fuel via injection valves 8, directly injected into the cylinder 5 or into the intake tract 2, so that the stoichiometric air/fuel ration can be accurately adjusted. Oxygen, which leaves the catalytic converter 6, can be detected by way of a post-cat probe 9. The pre-cat probe 7 and the post-cat probe 9 are connected for this purpose to a control unit 10 in a data transmitting manner. The control unit 10 is configured in order to increase or reduce an amount of fuel mK for each cylinder 5 individually or globally for all cylinders 5 together if appropriate so that altogether a stoichiometric air/fuel ratio (lambda=1) is maintained. By way of an air mass meter 11 which is signal-connected to the control unit 10 an intake air mass mA can be determined.

Regardless of this, an exhaust gas recirculation valve which is not shown can be arranged between the exhaust tract 3 and the intake tract for the purpose of admixing inert gas. Furthermore, the intake tract 2 can be connected to a compressor which is driven by an engine shaft or by an exhaust gas turbine in a gas-conducting manner in order to increase the air rate. Although the adjustment of the injected fuel quantity mK for an internal combustion engine operating according to the spark-ignition process is predominantly described here, employing the present disclosure for a diesel engine should be considered within the scope of this disclosure. The present disclosure described here can also be applied in combinations of diesel and spark-ignition engine which are currently still in the development stage.

Figure 2:
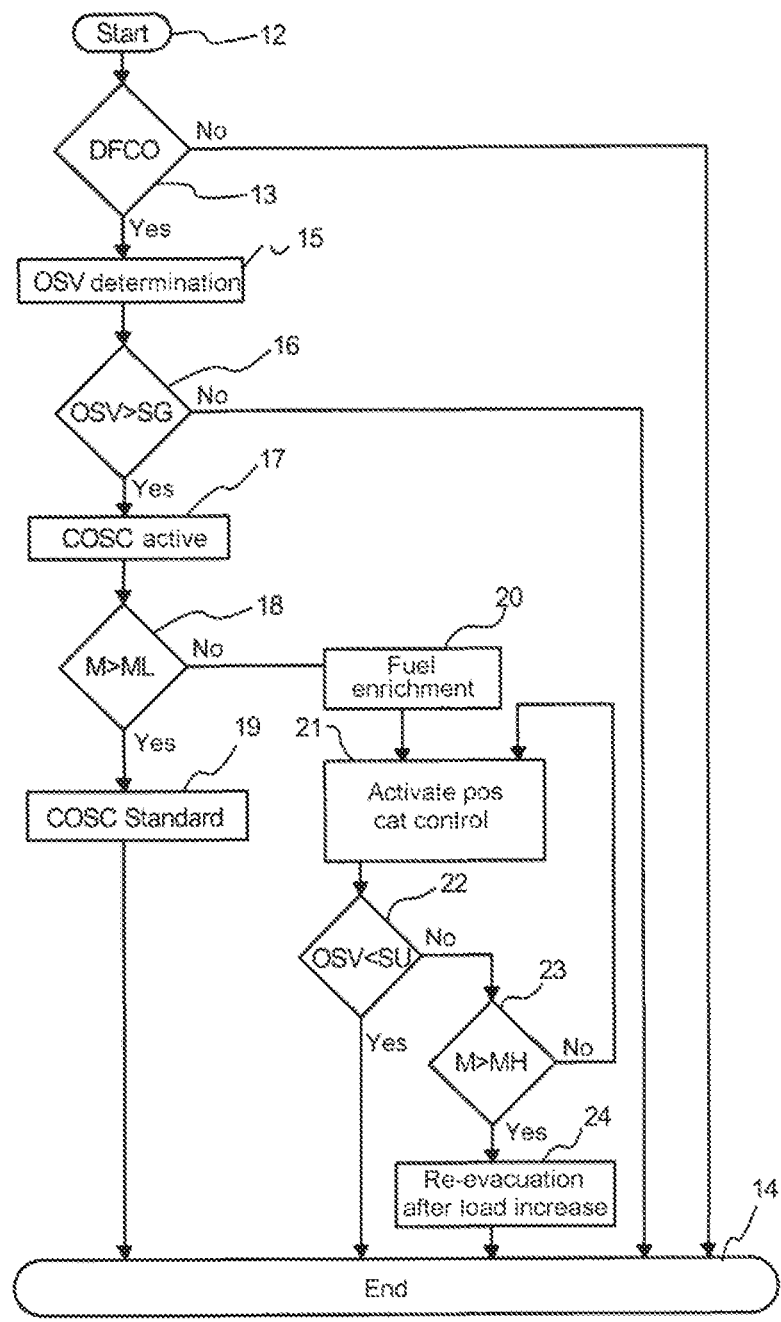
FIG. 2 schematically shows a process sequence which can be implemented in a control unit for controlling an internal combustion engine in order to fulfill an oxygen evacuation function.

FIG. 2 shows an exemplary method sequence, which along with a series of control programs can be implemented in the control unit 10 in order to control the oxygen content (OSV). In the catalytic converter 6 based on signals (in particular the signals from the pre-cat probe 7 and the post-cat probe 9) and adjusting values (in particular of a fuel quantity to be output by the injection nozzles 8). The method can be stored as a program and run continuously or be started only when the internal combustion engine operates in coasting mode. This takes place in particular always when following an operating phase with combustion (clutch engaged or not) the driver releases the accelerator pedal for controlling the load and the internal combustion engine 1 through its own inertia and in the state with clutch engaged is driven through the movement energy of the motor vehicle. In the process, no fuel is injected through the injection nozzles 8. However, air continues to pass through the internal combustion engine. In the catalytic converter 6, oxygen accumulates in the process. Following the recommencement of the combustion, the oxygen should be reduced as soon as possible, for example with uncombusted fuel components and carbon monoxide.

For this purpose it is provided, following the start 12 to ask in a question 13 if the fuel injection into the internal combustion engine 1 is deactivated (DFCO=deceleration fuel cut out). If the answer is "no", the method can be terminated in a step 14.

If the answer to question 13 is "yes", an oxygen storage value (OSV) is determined in a next step 15. This can take place with the help of a characteristic diagram, in which a corresponding oxygen storage value (OSV) is assigned based on empirically determined or calculated values of some input parameters (model-based determination of the oxygen storage value (OSV). The input parameters can include a throttle valve position, an intake air mass mA and an injected fuel quantity. Determining the oxygen storage value (OSV) continuously takes place preferentially throughout the method described herein, if appropriate corrected by the signal of the post-cat probe 9.

In a question 16 following the step 15 it is asked if the oxygen storage value (OSV) has exceeded a trigger evacuation threshold value SG. The trigger evacuation threshold value SG in this case is determined so that a proper function of the catalytic converter on undershooting of the trigger evacuation threshold value SG is ensured. The trigger evacuation threshold value in this case can be determined empirically by charging a catalytic converter up to an oxygen storage limit at which it no longer fulfills its function. The second comparison value can also be calculated from some parameters, for example the cubic capacity of the internal combustion engine, active catalyst surface area and the like.

If the answer to the question 16 is "no", the program can be terminated in a step 14, upon which it can run again. If the answer is "yes", oxygen has to be evacuated from the catalytic converter. Accordingly, in a subsequent step 17, a catalytic converter evacuation function (COSC active; COSC=catalyst oxygen storage control) is started and the engine load M determined Following this, it is asked in a question 18 if the engine load M is greater than a low-load threshold value MI. If the answer to the question 18 is "yes", an evacuation function (COSC standard) is started in a step 19, upon which through enrichment of the air/fuel mixture the stored oxygen can be reduced with a relatively large exhaust gas flow rate and thus relatively rapidly.

If the answer to the question 18 is "no", only a part evacuation is carried out in a step 20, in which fuel enrichment takes place. The fuel enrichment ensures a partial evacuation of the oxygen. The fuel enrichment in this case is kept very short in respect to time, for example 0.1 to 3 seconds, in particular 0.15 to 2.5 seconds or 0.2 to 2 seconds. The lambda value can be adjusted in a range from 0.8 to 0.99, in particular from 0.92 to 0.97 or from 0.94 to 0.96.

Upon the fuel enrichment, the mixture is slightly enriched, i.e. more fuel is injected than would be necessary for reducing the oxygen contained in the intake air quantity. Thus, sufficient fuel or sufficient fuel components remain in the exhaust gas in order to reduce the oxygen stored in the catalytic converter 6.

Following this, a post-cat control is activated in a step 21, during which the air/fuel ratio is adjusted via the post-cat probe 9 at a slightly rich mixture. Accordingly, more fuel is injected when oxygen is still detected on the post-cat probe 9.

Here, it is asked in a question 22 if the oxygen storage value OSV meanwhile has undershot a lower evacuation threshold value SU. If this is the case "yes", the method can be terminated in step 14. If the answer if "no", it is asked in a question 23 if the engine load M is higher than a high load threshold value MH. If not, the post-cat control according to step 21 remains active. If the engine load M is greater than the high-load threshold value MH, a post-catalytic converter evacuation following a load increase can be carried out in step 24, upon which the method can be terminated.

Figure 3:
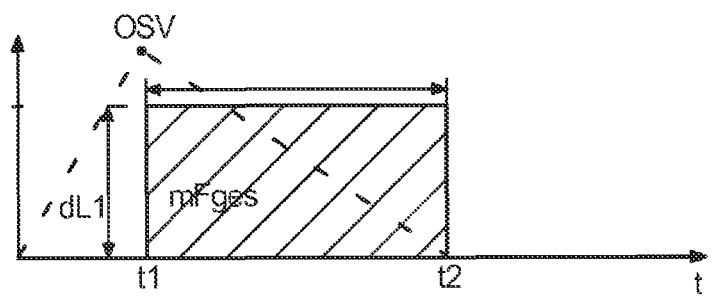
FIG. 3 shows a time curve of an oxygen storage value in an internal combustion engine with an already known evacuation function.

FIG. 3 schematically shows a time curve of an oxygen storage value OSV and dL1 for an internal combustion engine with an already known evacuation function. Following a deceleration fuel cut out, the oxygen storage value OSV increases. From a time t1 the mixture is enriched until as much fuel (mFges) has been injected as is necessary for reducing the oxygen present in the catalytic converter.

Figure 4:
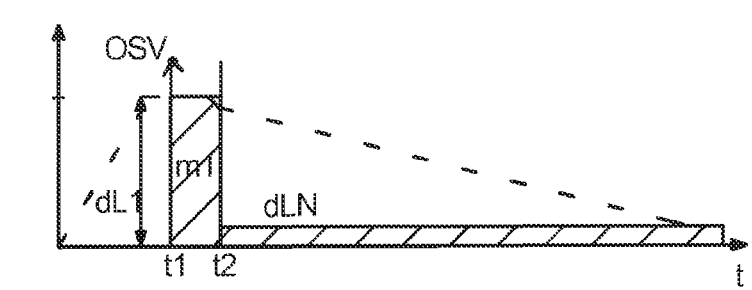
FIG. 4 shows the time curve of the oxygen storage value and of the connected lambda value with a fuel enrichment following the deceleration fuel cut out and a subsequent post-cat control.

FIG. 4 shows the time curve of the oxygen storage value and of the connected lambda differential value dL1 upon a fuel enrichment following the deceleration fuel cut out and a subsequent post-cat control. From the time t1 the fuel enrichment at which a fuel quantity m1 is injected takes place, which reduces only a part of the stored oxygen. Following this, a post-cat control takes place from the time t2, at which a slight enrichment of the mixture is expected.

Figure 5:
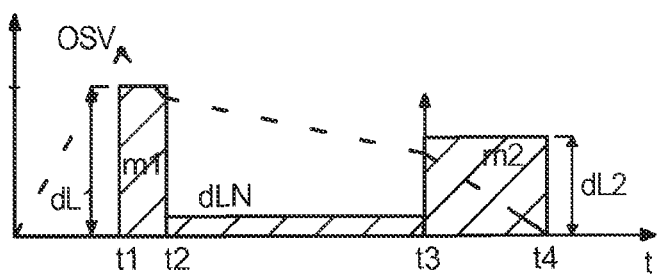
FIG. 5 shows a time curve of an oxygen storage value and of a connected lambda differential value with a first fuel enrichment following a deceleration fuel cut out and a subsequent temporary post-cat control and a subsequent fuel enrichment, which is carried out upon a load increase.

FIG. 5 shows a further time curve of an oxygen storage value and a connected lambda differential value dL1. Following a fuel enrichment following a deceleration fuel cut out from the time t1 and a subsequent temporary post-cat control from the time t2, fuel enrichment is carried out at a lambda differential value dL2 to a time t3. In the time t3, the engine load exceeds the high-load engine threshold value. The exhaust gas flow rate is now so high that the remaining stored oxygen at the time t4 is largely reduced, at any rate has undershot the trigger evacuation threshold value SG (not shown).

Figure 6:
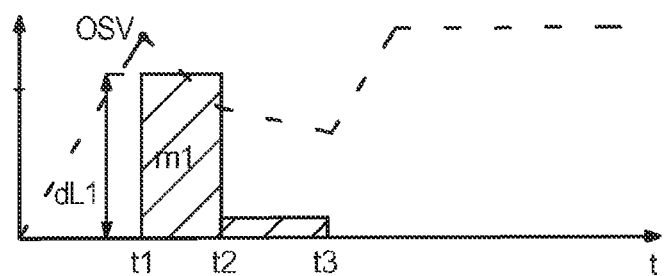
FIG. 6 shows a time curve of an oxygen storage value and of a differential lambda value following a deceleration fuel cut out with a renewed deceleration fuel cut out, which takes place during the evacuation function.

FIG. 6 shows a time curve of an oxygen storage value OSV and of a lambda differential value dL1 following a deceleration fuel cut out with a renewed deceleration fuel cut out taking place at a time t3, which takes place during the evacuation function. It is evident that the evacuation function is aborted and only carried out again if appropriate after the coasting mode phase (not shown).

Figure 7:
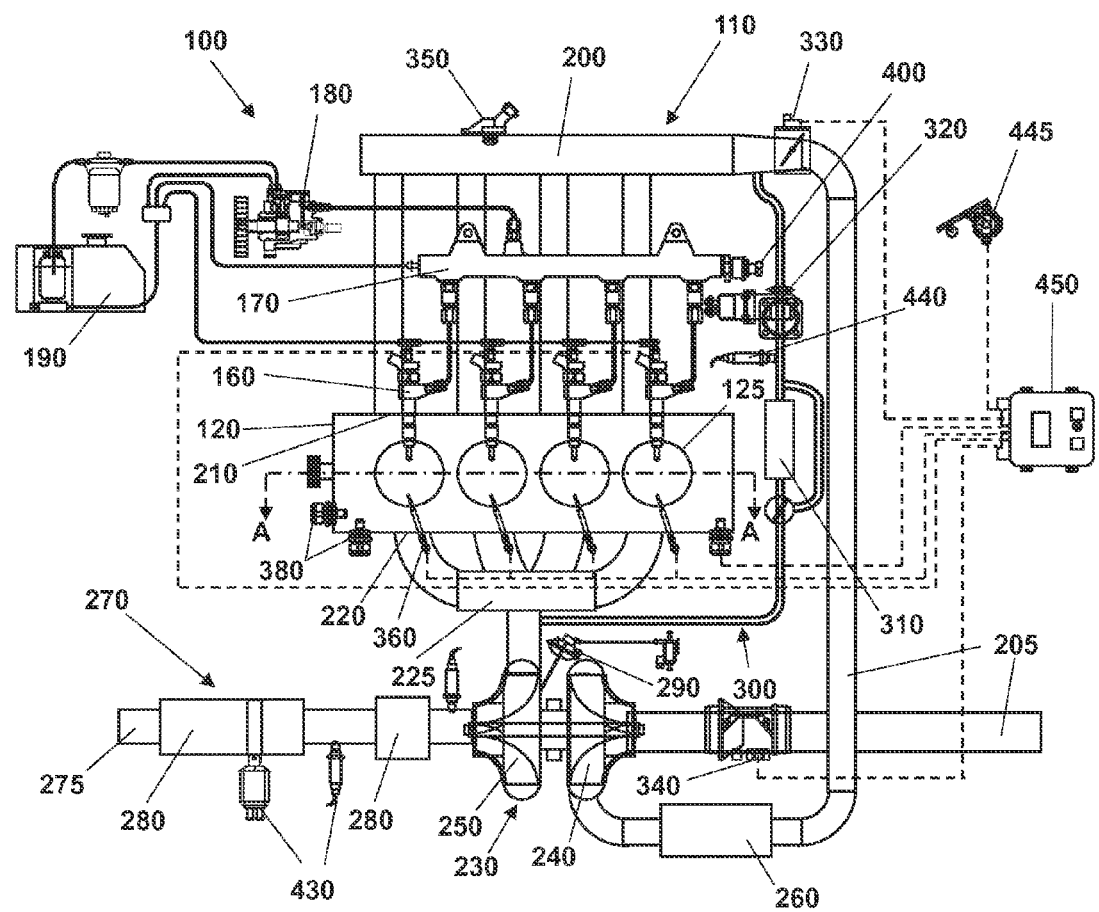
FIG. 7 shows a schematic representation of a motor vehicle system with an internal combustion engine.
Figure 8:
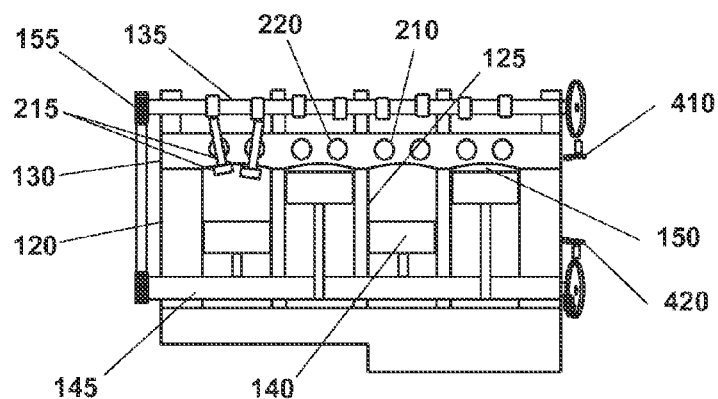
FIG. 8 shows a section through engine block.

Some embodiments of the motor vehicle can include a motor vehicle system 100, which is shown in the FIGS. 7 and 8, and which includes an internal combustion engine (ICE) 110 with an engine block 120, which defines at least one cylinder 125 with a piston, wherein the piston 140 has a coupling with which the crankshaft 145 is rotated. A cylinder head 130 cooperates with the piston 140 in order to define a combustion chamber 150. An air-fuel mixture (not shown) is introduced and ignited in the combustion chamber 150, which results in hot expanding combustion gases, which lead to a reciprocating movement of the piston 140. The fuel is made available by at least one fuel injector 160 and the air through at least one inlet 210. The fuel is conducted to the inlet 210 under high pressure from a fuel pipe 170, which is connected in a fluid-feeding manner to a high-pressure pump 180, which increases the pressure of the fuel originating from a fuel source 190. Each of the cylinders 125 has at least two valves 215, which are operated by a camshaft 135, which rotates at the same time as the crankshaft 145. The valves 215 selectively admit air from the inlet 210 into the combustion chamber 150 and alternatingly allow exhaust gases to exit the outlet 220. In some embodiments, a camshaft adjusting system 155 is utilized in order to selectively change the time sequence between the camshaft 135 and the crankshaft 145.

The air can be fed to the air inlets 210 via an inlet manifold 200. A line 205 feeds ambient air to the inlet manifold 200. In other embodiments, a throttle valve 330 can be selected in order to control the air flow to the inlet manifold 200. In further embodiments, a system for compressed air such as for example a turbocharger 230 is employed with a compressor 240, which rotates together with a turbine. The rotation of the compressor 240 increases the pressure and the temperature of the air in the line 205 and the inlet manifold 200. An intercooler 260 which is contained in the line 205 can reduce the temperature of the air. The turbine 250 rotates during the inflow of the exhaust gases coming from an exhaust manifold 225, which guides exhaust gas from the outlet 220 through a series of guide blades before it is expanded through the turbine 250. The exhaust gases leave the turbine 250 and are conducted to an exhaust system 270. This example shows a turbine with variable geometry (VGD) with a VGD actuator 290 which is designed in order to move the guide blades or vanes so that the vanes change the flowing of the exhaust gas through the turbine 250. In other embodiments, the turbocharger 230 can have a fixed geometry and/or a waste gate.

The exhaust system 270 can include an exhaust pipe 275, which has one or multiple exhaust gas retreatment devices 280. Exhaust gas retreatment systems can be any devices with which the composition of the exhaust gases can be changed. Some examples of exhaust gas retreatment systems are catalytic (2 and 3-way) converters, oxidation catalytic converters, NOx-traps for lean operation (lean NOx traps), hydrocarbon absorbers, systems for the selective catalytic reduction (SCR) and particle filters. Other embodiments include an exhaust gas recirculation system (EGR) 300, which is connected to the exhaust manifold 225 and the inlet manifold 200. The EGR 300 can include an EGR-cooler 310 in order to reduce the temperature of the exhaust gases in the EGR 300. An EGR-valve 320 controls the flow of the exhaust gases in the EGR system 300.

Furthermore, the motor vehicle system 100 can include an electronic control unit (ECM) which is configured in order to send or receive signals to or from various devices which are connected to the ICE 100. The ECM 450 can receive input signals from various sensors which are coupled to the ICE 110, for example a mass flow and temperature sensor 340, a pressure and temperature sensor 350 for the manifold, a sensor 360 for the pressure in the combustion chamber, sensors 380 for the cooling fluid and the oil temperature and/or the associated filling level, a pressure sensor 400 for the fuel, a camshaft position sensor 410, a crankshaft position sensor 420, sensors 430 for the pressure and the temperature of the exhaust gases, an EGR temperature sensor 440 as well as a position sensor 445 for the accelerator pedal. Furthermore, the ECU 450 can emit output signals to various control units in order to control the operation of the ICE 110, for example to fuel injectors 160, to the throttle 330, to the EGR-valve 320, to the VGT-actuator 290 and to the camshaft adjusting system 155. It must be noted that dashed lines are used in order to indicate various connections between the different sensors, devices and the ECM 450, while others are omitted for the sake of clarity.

The control unit 450 can include a digital microprocessor unit (CPU) which is data connected to a storage system and to a bus system. The CPU is designed to execute commands which are embodied as a program which is stored in a storage system, to detect input signals from the data bus and to emit output signals to the data bus. The storage system can include various storage media such as optical, magnetic, solid state and other non-volatile media. The program can be of such a nature that it executes or is configured to carrying out the methods described here, so that the CPU can execute the steps of such methods, thereby controlling the ICE 110.

Instead of an engine control unit 450, the motor vehicle system can have another type of processor in order to provide the electronic logic, for example an embedded controller, an on-board computer or any other type of processor that can be used in a vehicle.

Although in the preceding description some possible embodiments of the present disclosure were disclosed it is to be understood that numerous further variants of embodiments exist through combination possibilities of all mentioned features and embodiments which were mentioned and additionally all features and embodiments which are obvious to the person skilled in the art. It is to be understood, furthermore, that the exemplary embodiments are to be understood merely as examples which do not restrict in any way the scope of protection, the applicability and the configuration. The preceding description is intended rather to show the person skilled in the art a suitable way of realizing at least one exemplary embodiment. It is to be understood that with an exemplary embodiment, numerous changes with respect to function and arrangement of the elements can be carried without leaving the scope of protection disclosed in the claims and its equivalent.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for controlling a motor vehicle with an internal combustion engine and a catalytic converter, the method configured to be performed by a processor, the processor configured to perform the method comprising the steps of:
   determining an oxygen storage value for oxygen stored in the catalytic converter based on a deceleration fuel cut out,
   detecting an engine load, and
   carrying out a part evacuation of the oxygen from the catalytic converter with a fuel enrichment based on the oxygen storage value exceeding a trigger evacuation threshold value and the engine load being below a low-load threshold value;
   adjusting an air/fuel ratio to a rich mixture based on the carrying out of the part evacuation of the oxygen from the catalytic converter; and
   maintaining the air/fuel ratio at the rich mixture based on the oxygen storage value exceeding a lower evacuation threshold value and the engine load remaining less than a high-load threshold value,
   wherein the low-load threshold is less than the high-load threshold, and the carrying out of the part evacuation of the oxygen from the catalytic converter with the fuel enrichment and the maintaining the air/fuel ratio at the rich mixture are each based on the determining of the deceleration fuel cut out.

2. The method according to claim 1, wherein the first fuel enrichment is carried out at a lambda value from 0.8 to 0.99.

3. The method according to claim 1, wherein the part evacuation is 0.1 to 3 seconds long.

4. The method according to claim 1, wherein following the part evacuation a lambda value from 0.997 to 0.998 is adjusted via a post-cat probe which is arranged downstream of the catalytic converter until the oxygen storage value drops below the lower evacuation threshold value or the engine load exceeds the high-load threshold value.

5. The method according to claim 4, wherein based on an engine load greater than the low-load threshold value, the catalytic converter is evacuated through a post-cat control.

6. The method according to claim 5, further comprising detecting by the post-cat probe, oxygen in the exhaust gas after the catalytic converter and increasing a fuel supply to the internal combustion engine through the post-cat control to reduce the oxygen in the exhaust gas.

7. The method according to claim 1 wherein the oxygen storage value is modeled based on at least one of lambda control and engine parameters.

8. A motor vehicle, comprising:
   an internal combustion engine including an exhaust tract having a catalytic converter;
   a pre-cat probe in fluid communication with the exhaust tract upstream from the catalytic converter;
   a post-cat probe downstream from the catalytic converter and in fluid communication with the catalytic converter; and
   a control unit onboard the motor vehicle having a processor that, based on a deceleration fuel cut out:
      determines an oxygen storage value for oxygen stored in the catalytic converter;
      detects an engine load;
      carries out a part evacuation of the oxygen from the catalytic converter with a fuel enrichment based on the oxygen storage value exceeding a trigger evacuation threshold value and the engine load being below a low-load threshold value;
      adjusts an air/fuel ratio to a rich mixture based on the part evacuation of the oxygen from the catalytic converter; and
      maintains the air/fuel ratio at the rich mixture based on the oxygen storage value exceeding a lower evacuation threshold value and the engine load remaining less than a high-load threshold value,
      wherein the low-load threshold is less than the high-load threshold.

9. A computer program product for controlling a motor vehicle with an internal combustion engine and a catalytic converter, the computer program product including a tangible storage medium readable by a processor and storing instructions for execution by the processor for carrying out a method, the processor configured to perform the method comprising:
   determining an oxygen storage value for oxygen stored in the catalytic converter based on a deceleration fuel cut out;
   detecting an engine load of the internal combustion engine;
   carrying out a part evacuation of the oxygen from the catalytic converter with a fuel enrichment based on the oxygen storage value exceeding a trigger evacuation threshold value and the engine load being below a low-load threshold value;
   adjusting an air/fuel ratio to a rich mixture based on the carrying out of the part evacuation of the oxygen from the catalytic converter; and
   maintaining the air/fuel ratio at the rich mixture based on the oxygen storage value exceeding a lower evacuation threshold value and the engine load remaining less than a high-load threshold value,
   wherein the low-load threshold is less than the high-load threshold, and the carrying out of the part evacuation of the oxygen from the catalytic converter with the fuel enrichment and the maintaining the air/fuel ratio at the rich mixture are each based on the determining of the deceleration fuel cut out.

* * * * *